United States Patent Office 3,405,157
Patented Oct. 8, 1968

3,405,157
THIOFORMYLDIPHENYLTHIOPHOSPHINATES
Sheldon Herbstman, Spring Valley, N.Y., assignor to Stauffer Chemical Company, New York, N.Y., a corporation of Delaware
No Drawing. Filed Oct. 23, 1965, Ser. No. 504,190
5 Claims. (Cl. 260—455)

This invention relates to organophosphorus esters and in particular to thioformyldiphenylthiophosphinates. The invention is likewise concerned with the use of the aforenamed materials as light and heat stabilizers for poly-α-olefin compositions.

As used herein dithioformyldiphenylphosphinates include thioformyldiphenylphosphinothioate and thiofomyldiphenyldithioates.

It is known that plastics and polymeric materials generally undergo degradation in the presence of light and/or heat. Especially sensitive to these agencies are some of the recently developed synthetic resins and in this connection mention is made of the poly-α-olefins such as polyethylene, polypropylene and the like. For instance, isotactic polypropylene undergoes air oxidation at the relatively mild temperature of 125°. Even more sensitive are polypropylene fibers which lose about 50% of their tensile strength when exposed for fifty hours in a circulating air oven at 125° C. At the end of 100 hours, the fibers are transformed into a powdery material.

Isotactic polypropylene is also unusually sensitive to ultraviolet light as shown by an appreciable lessening of tensile strength after fifty hours exposure to this damaging actinic radiation. In order to increase the life of plastics and polymers, it is the practice to incorporate therein certain substances, usually referred to as ultraviolet absorbers, which are capable of absorbing the incident actinic radiation thereby protecting the plastic substrate from deterioration. It is also the practice to use other types of additives which are capable of preventing breakdown of the plastic due to air oxidation at elevated temperatures. These latter additives are customarily designated as heat stabilizers and commonly embrace a phenolic type of structure.

It has now been discovered that certain thioformyldiphenylthiophosphinates are effective in protecting poly-α-olefins against the deleterious effects of both light and heat and the provision of such compounds constitutes the primary purpose and object of the present invention. Another important object of the invention is to provide poly-α-olefin compositions stabilized with the above named compounds. Other objects and purposes will become manifest hereinafter.

The thioformyldiphenylthiophosphinates of the invention which constitute a hitherto unknown class of organophosphorus esters can be depicted by the following formula:

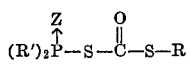

wherein R is alkyl of from 1 to 20 carbon atoms, e.g. methyl, ethyl, n-propyl, isopropyl, n-butyl, isobutyl, sec.-butyl, n-pentyl, isopentyl, n-hexyl, isohexyl, n-heptyl, n-octyl, isooctyl, n-nonyl, n-decyl, n-undecyl, n-dodecyl, tridecyl, tetradecyl, pentadecyl, hexadecyl, heptadecyl, octadecyl, nondecyl, etc., an aromatic hydrocarbon radical such as phenyl, naphthyl and the like, or an aralkyl radical such as benzyl; R' is an aromatic hydrocarbon radical such as phenyl, or substituted phenyl as illustrated by halophenyl, chloropenyl, lower alkylated phenyl, lower alkoxy phenyl and the like or naphthyl, and Z is a chalcogen as exemplified by sulfur and oxygen. Specific compounds falling within the ambit of the above depicted formula include the following:

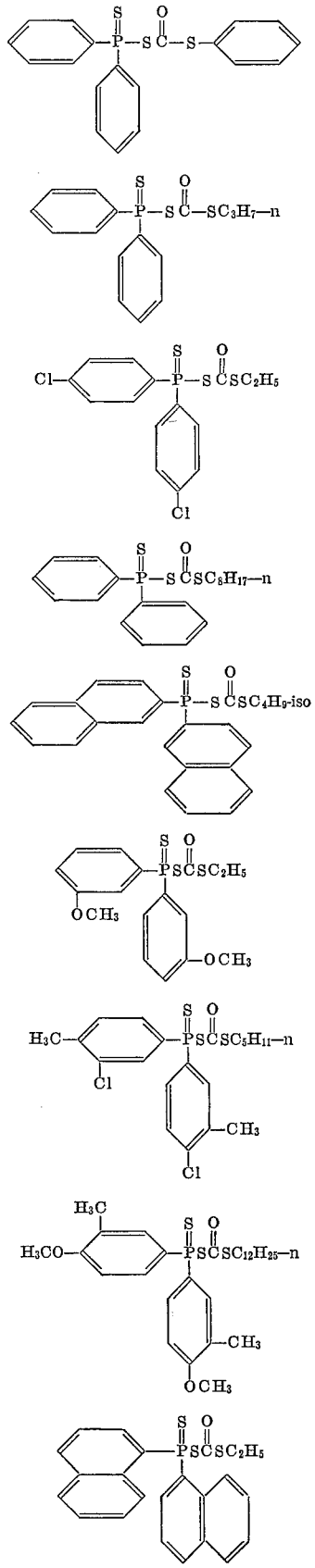

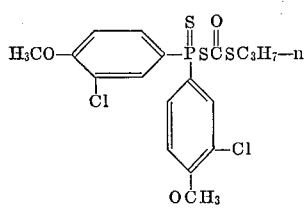

The thioformyldiphenylthiophosphinates of the invention can be realized by reacting a thioformyl halide such as methylthioformyl chloride with a diarylphosphinothioate or a diarylphosphinodithioate salt in accordance with the chemical equation set forth below:

wherein R, R' and Z have the values as previously assigned and M is a metallic cation such as sodium, potassium, lithium, ammonium, substituted ammonium or silver. In preparing the new organophosphorus esters of the invention, I have ascertained that generally excellent results ensue by heating the thioformyl halide with the alkali metal or ammonium salt of the requisite diarylthiophosphinic acid with or without a solvent and thereby isolating the thioformyldiarylthiophosphinate ester from the by-product of alkali metal or ammonium halide. An especially convenient means for carrying out the reaction is to reflux the components in the presence of a relatively inert organic solvent such as the lower ketones, alcohols, saturated aliphatic hydrocarbons, aromatic hydrocarbons or their chlorinated derivatives or the liquid saturated aliphatic ethers. After removing the alkali metal halide by-product and distilling off the solvent, the residual thioformyldiarylthiophosphinate ester can be isolated by employing the usual techniques available to the skilled organic chemist such as crystallization, distillation, sublimation and the like.

The ultraviolet and heat stabilizers contemplated by the invention can be blended or incorporated into the poly-α-olefin compositions by any of the conventional methods commonly used for mixing such materials with resins and plastics. A typical procedure comprises milling on heated rolls, although deposition from solvents and dry blending are other well known techniques.

The poly-α-olefin compositions stabilized in accordance with the invention exhibit an extended life expectancy and are much more useful and practical than unstabilized poly-α-olefins and moreover possess a wide diversity of uses including out-of-door installations under prolonged exposure to sunlight and the elements. The poly-α-olefins stabilized as contemplated herein can be cast, extruded, rolled or molded into sheets, rods, tubes, piping, filaments and other shaped articles, including sheets or films ranging from 0.5 to 100 mils in thickness. The polymer compositions of my invention can be applied as coatings to paper, cloth, wire, metal foil and are suitable for the manufacture of synthetic fibers and fabrics. Although the quantity of stabilizer is not particularly critical, it is recommended that the concentration based on the weight of the polymer be maintained in the range of 0.01 to about 5.0%.

The organic thiophosphorus compounds as described herein are suitable for stabilizing a wide variety of solid poly-α-olefin compositions against deterioration resulting from exposure to actinic radiation. In this connection, mention is made of any of the normally solid polymers derived from the polymerization of α-mono-olefinic aliphatic hydrocarbons containing from two to ten carbon atoms. Typical poly-α-olefins include polyethylene, polypropylene, poly(3-methylbutene-1), poly(4-methylpentene-1), poly(pentene-1), poly(3,3-dimethylbutene-1), poly(4,4-dimethylbutene-1), poly(octene-1), poly(decene-1), and the like. I have ascertained that the organic thiophosphorus stabilizers of the invention are particularly effective for preventing photodegradation by ultraviolet light or sunlight of the highly crystalline polyolefins such as isotactic polypropylene. Isotactic polypropylene is a stereo-regular polymer wherein the monomeric units are linked predominantly end-to-end rather than the more common arrangement consisting of a distribution of linear and cross-linked units. Moreover, the substituents attached to the chain are systematically disposed in a configuration which tends to promote an orderly and close alignment of the molecules. Such stereo-regular polymers exhibit a high degree of crystallinity and are much superior in physical properties to amorphous polymers having a random distribution of monomeric units. For a fuller description of crystalline polymers, reference is made to the Scientific America, 197, No. 3, pages 98–104 (1957); 205, No. 2, pages 33–41 (1961).

Although the molecular weight of poly-α-olefins varies over wide limits, the U.V. stabilizer compounds of the invention are not restricted to any particular molecular weight range and in fact it has been my finding that excellent protection can be achieved with poly-α-olefins ranging in molecular weight from about 15,000 to about 20,000. Moreover, the so-called poly-α-olefin waxes are likewise susceptible to U.V. stabilization by means of the compounds of the invention.

The following examples illustrate the procedures for preparing the thioformyldiarylthiophosphinates and to poly-α-olefin compositions containing such compounds but it is to be understood that the inclusion of such examples is not to be taken as limiting or otherwise imposing any restriction on the invention and it is to be further understood that variations in practicing the same without departing from the scope or spirit thereof will be apparent to those skilled in the art to which the said invention pertains.

PREPARATION OF THE COMPOUNDS

Example 1.—Methylthioformyldiphenyl-phosphinodithioate

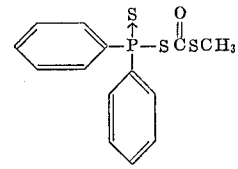

6.8 g. (0.025 mole) sodium diphenylphosphinodithioate was dissolved in 100 ml. of acetone to which was added slowly 2.76 g. (0.025 mole) of methylthioformylchloride dissolved in 25 ml. of acetone. The reaction mixture was refluxed for two hours, during which time sodium chloride separated out. After the reflux period, the sodium chloride was separated by filtration and the filtrate then subjected to distillation to remove the acetone and any other volatile materials. The solid residue was purified by crystallization from benzene, giving a yield of purified methylthioformyl diphenylphosphinodithioate corresponding to 81% of theory. The melting point of the white, crystalline product is 80° C.

Using the procedure as given in Example 1, the following other compounds were synthesized:

Example 2.—Phenylthioformyldiphenylphosphino-dithioate

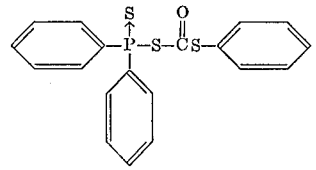

White crystals; M.P. 62°.

Example 3.—n-Propylthioformyldiphenylphosphinodithioate

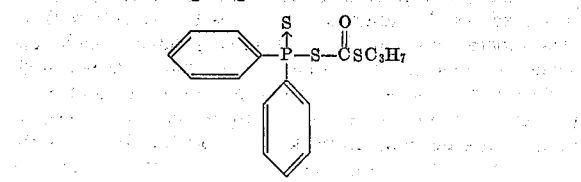

Yellow oil, B.P. 52°/1.0 mm.

Example 4.—n-Octylthioformyldiphenylphosphinodithioate

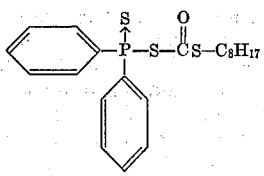

Yellow oil, nondistillable.

POLYMERIC COMPOSITIONS CONTAINING THE COMPOUNDS

Example 5

A dry blend consisting of 0.5% by weight of methylthioformyl diphenylphosphinodithioate and 50 g. of isotactic polypropylene was subjected to compression molding in the usual manner at a temperature of 400° F. for six minutes at 2000 p.s.i. The blended polymer was compression molded or extruded into a 25 mil sheet and thereafter cut into square samples measuring 2 inches on the side. A like sample containing no stabilizer was also prepared and tested. The samples were then exposed in a Xenon Arc Weatherometer operating at 600 watts. The water cycle was adjusted whereby each sample was subjected to 18 minutes of water spray and 102 minutes of dry exposure for each two hours of exposure. Exposure damage to the samples of polypropylene was assessed with respect to change of structural strength.

After a period of exposure in excess of 850 hours, the test sheet of polypropylene showed no signs of brittleness to 180° flexure test. Nor was there any evidence at this time of any surface crazing or any coloration or staining. A blank specimen of unstabilized polypropylene which was exposed concurrently with the stabilized product failed the flexure test after 250 to 300 hours exposure time.

The polypropylene resin as used in the above described example is an unstabilized general purpose, high molecular weight polypropylene of the isotactic or crystalline type. Typically, it has a melt index of 4 at 230° C. and a specific gravity of 0.905.

As previously pointed out elsewhere herein, the thioformyldiphenylthiophosphinates of the invention are not only effective as light and ultraviolet stabilizers but are also capable of affording protection of the polymeric substrate against heat degradation. In this connection, an especially interesting and highly valuable property of the compounds of the invention is that they are capable of being synergized with esters of thiodipropionic acid. Although this well-known synergist is capable of emphasizing or amplifying the stabilization of antioxidants generally one class of stabilizers which is an exception to the rule are the organophosphorus derivatives. However, the particular organophosphorus compounds of the invention are surprisingly susceptible to being synergized by thiodipropionic acid esters and this constitutes a new and valuable asset of the invention. The amount of the synergist required to complement the stabilizing properties of the thioformyl diphenylthiophosphinate lies within the usual range, that is to say, from about 0.01% to about 5.0% by weight based on the weight of the polymer; I have ascertained, for instance, that a concentration of 0.2% of the thiodipropionic acid ester is eminently satisfactory. A typical procedure for combining the thioformyldiphenylthiophosphinate stabilizers of the invention and the thiodipropionic acid ester synergist is set forth in the following example:

Example 6

10.0 g. powdered polypropylene resin containing 0.5% of methylthioformyldiphenylphosphinodithioate and 0.2% of dilaurylthiopropionate was placed on the center of a 6" x 6" stainless steel plate. A similar steel plate was then placed on top of the powder while exerting a slight downward pressure. The assembly was placed in the center of the lower platen of a hydraulic press which was previously heated to 400° F. The lower platen of the press was raised until both platens contacted the upper and lower 6" x 6" stainless steel plates. The powder sample was allowed to warm up for about 4 minutes or until fusion of the resin occurred. As the pile of resin began to melt, the lower platen of the press was raised slightly to ensure that both platens contacted the steel plates enclosing the sample. After about 4 minutes or when the fusion of the resin occurred, the lower platen was raised to a one ton load and so maintained for 2 minutes. The drain valve was then opened to vent off steam, after which cold water was admitted to cool the platens and plates to 50° F. The molded sheet of resin was approximately 25–30 mils thick.

1" discs were cut from the molded sheet and placed in petri dishes and then exposed to a temperature of 150° C. in a forced draft oven. The sample containing the methylthioformyl diphenylphosphinodithioate survived an exposure time in the neighborhood of 150 hours before exhibiting signs of enbrittlement.

The mixture of powdered propylene resin and antioxidant as used in the above described procedure was prepared by intimately mingling the propylene resin and antioxidant in a Waring blendor until a homogeneous mixture of the components was obtained.

The polypropylene resin as used in the example above was identical with the resin which was defined and described under Example 5.

Diesters of 3,3'-thiodipropionic acid which are used in combination with the stabilizer components of the invention have the following formula:

$$S(CH_2 \cdot CH_2 \cdot COOR)_2$$

wherein R is an alkyl radical having at least 4 and generally 4 to 20 carbon atoms with 8 to 18 carbon atoms being preferred. An especially efficacious ester has 12 carbon atoms per R substituent, namely 3,3'-thiodipropionic acid dilauryl ester. However, any diester of 3,3'-thiodipropionic acid described above can be employed in the present stabilizer combination, wherein R is butyl, amyl, hexyl, heptyl, octyl, nonyl, decyl, tridecyl, tetradecyl, and the like.

I claim:

1. An organophosphorus ester of the formula:

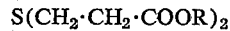

wherein R is selected from the class consisting of alkyl of from 1 to 20 carbon atoms, phenyl, naphthyl and benzyl, R' is an aromatic hydrocarbon radical selected from the class consisting of phenyl, naphthyl, chlorophenyl, lower alkylated phenyl and lower alkoxyphenyl and Z is a chalcogen selected from the class consisting of sulfur and oxygen.

2. Methylthioformyldiphenylphosphinodithioate.
3. Phenylthioformyldiphenylphosphinodithioate.
4. n-Propylthioformyldiphenylphosphinodithioate.
5. n-Octylthioformyldiphenylphosphinodithioate.

No references cited.

CHARLES B. PARKER, *Primary Examiner*

D. R. PHILLIPS, *Assistant Examiner.*